US006800171B2

(12) United States Patent
Van Tyle

(10) Patent No.: US 6,800,171 B2
(45) Date of Patent: Oct. 5, 2004

(54) PEELABLE TEMPORARY MASKING COATINGS

(76) Inventor: Peter R. Van Tyle, 17 E. Elizabeth St., Skaneateles, NY (US) 13152

( * ) Notice: Subject to any disclaimer, the term of this patent is extended or adjusted under 35 U.S.C. 154(b) by 0 days.

(21) Appl. No.: 10/197,296

(22) Filed: Jul. 16, 2002

(65) Prior Publication Data

US 2002/0174949 A1 Nov. 28, 2002

Related U.S. Application Data

(63) Continuation-in-part of application No. 09/651,745, filed on Aug. 30, 2000, now Pat. No. 6,464,823.

(51) Int. Cl.[7] .......................... B32B 35/00; B05D 1/26

(52) U.S. Cl. .......................... 156/344; 427/11; 427/154; 427/284

(58) Field of Search .......................... 427/11, 154, 282, 427/284; 156/344

(56) References Cited

U.S. PATENT DOCUMENTS 4,652,163 A * 3/1987 Karliner et al. ............. 401/195
5,750,190 A * 5/1998 Woodhall et al. ........... 427/156
5,866,199 A * 2/1999 Swidler et al. ............. 427/154
6,090,451 A * 7/2000 Barth et al. ................. 427/429

* cited by examiner

*Primary Examiner*—Mark A. Osele
(74) *Attorney, Agent, or Firm*—Bernhard P. Molldrem, Jr.

(57) ABSTRACT

A paint mask dispensed onto a surface to be protected by finger application, or may be housed in and dispensed from a receptacle with a sponge or similarly porous and flexible tip. The paint mask permits immediate and convenient use by application to the surface of glass or other base to be protected from inadvertent paint, especially window frames and mullions, while prohibiting paint to affix itself to window glass. The painter may spread the mask onto the surface by means of the pad on one's finger, or may conveniently grip the paint mask applicator and drag the tool end of the dispenser onto targeted areas of the surface to be protected. The mask forms a skin onto which paint, varnish, or other coating material may have adhered or contacted and which resides upon a lubricated layer such that it may be slid, wiped, rinsed or peeled away. The need for razor blades or other hard or sharp instruments is avoided.

6 Claims, 1 Drawing Sheet

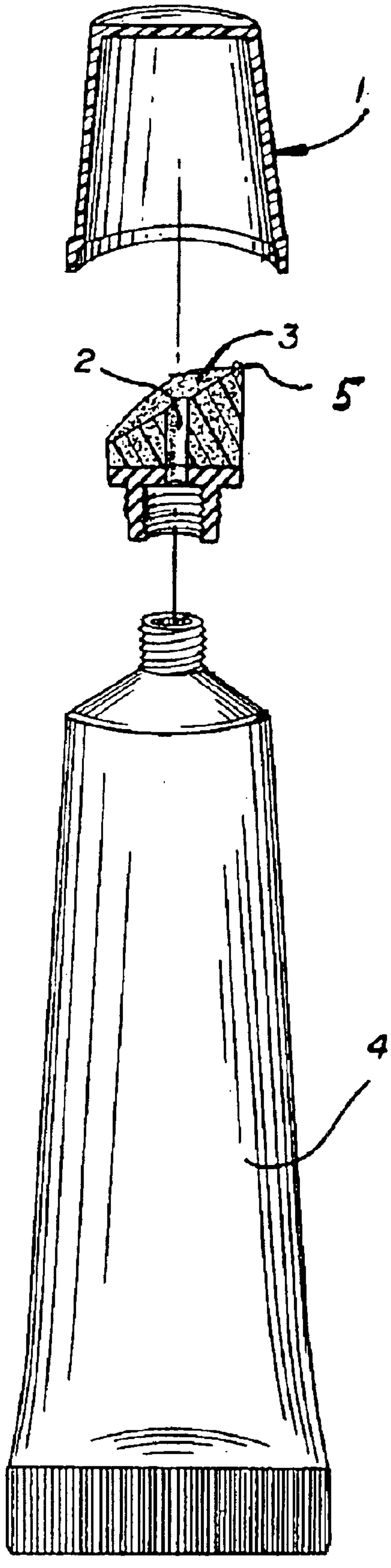
1
3
2
5
4

PEELABLE TEMPORARY MASKING COATINGS

This application is a continuation-in-part of co-pending U.S. patent application Ser. No. 09/651,745 filed Aug. 30, 2000, now U.S. Pat. No. 6,464,823.

BACKGROUND OF THE INVENTION

This invention relates to a masking process whereby a mask liquid or gel is applied onto a surface to be protected from paint or other temporary coatings by means of one's finger or by a sponge tipped applicator connected to a container housing the masking material. The masking material temporarily masks a surface from paint, varnish or other coatings by applying a temporary masking coating directly onto the surface to be masked, and thereafter removing the masking coating onto which paint varnish or other coating has adhered or made contact. The mask and coating forms a skin, removable by peeling or sliding wiping or rinsing away the skin from the protected surface.

The present invention meets the need in the art by providing a single handed masking process that renders a convenient and accurately applied paint mask for windows and other surfaces that require masking protection from paint, varnish or other coatings. The invention's ease and accuracy in application overcomes the disadvantages present in spray masks. The mask material and paint are simply slid, wiped, rinsed or peeled away from the protected surface like tape, yet without the difficulties that attend the application of tape to a surface. Use of this mask does not leave the tacky residue associated with masking tape nor does it involve the health hazards and damaging scratches associated with razor blades. This mask dispensing process may be accomplished through the use of a variety of substances and still meet the masking needs of window painters.

Methods had previously been developed to shield the glass from errant paint, including the use of plastic inserts, masking tape, liquid masks, and dabbing viscous substances such as petroleum jelly onto glass. Painters looked for three characteristics in their masking efforts: the mask had to be easy to apply, easy to remove, and provide an effective shield from adhering coatings. Existing masking techniques offer the required paint shielding but are difficult to use. For example, smearing petroleum jelly onto glass may offer an adequate shield from paint drips yet present an unacceptable application in that its removal is messy. The current peelable paint masking process permits inadvertant paint to be easily applied with the finger or sponge applicator, and removed by sliding or peeling the mask off the protected surface.

OBJECTS AND SUMMARY OF THE INVENTION

The novel mask application and removal process herein described offers clear advantages over traditional plastic inserts, masking tape. Advantages include 1.) even film thickness, 2.) uniform dispensing, 3.) regulation of amounts dispensed, 4.) predictable film strip width, 5.) accuracy 6.) adequate shielding and 7.) easy slide-off or peel-off removal.

A preferred embodiment of this masking process involves the painting of windows. Painting window frames is a tedious and time-consuming task. The painter desires to fully cover the window frame while avoiding getting the paint on the windowpane itself. Often, window glass is separated by narrow dividers known as mullions. The mullion is a slender member placed between adjacent panes of glass supported by a flange and held in place by putty, caulk or a narrow strip of wood that covers the outside edge of the glass adjacent the mullion. When window frames or mullions are painted, the paint which otherwise gets on the window pane must be thoroughly removed.

Past efforts at keeping paint from getting onto the windowpanes had been accomplished by masking the glass with tape along the perimeter of the pane where glass meets frame or mullion so that the trim or frame material can be painted quickly and without regard to the juncture between glass and trim since any excess paint will be applied to the protective coating. However, applying tape is laborious and time consuming and removing the tape from the glass often presents problems, particularly where the tape hardens or becomes tacky. Where tape has not been employed, paint must be scraped off the glass typically with a razor blade. Another method of masking involves a triangular mask with an adhesive strip around the perimeter. The triangular mask is applied to the glass surface and overlapped to cover the entire surface with a portion of the mask. Portions that overlay the mullions would need to be cut off so as not to interfere with the painting of the frames. Another device provides a flexible narrow blade with a straight edge that contacts the mullion. The ends of the blade are cut at an oblique angle. Two adjacent blades join at a corner of the window. A rubber vacuum cup attaches to each of the blades for securing the blade to the glass. Another device has a spring clip that engages opposed mullions frictionally. The clip presses a cardboard paint shield firmly against the adjacent windowpane. Another device involves a fitting that permits the application of caulk along the perimeter of the pane which caulk may be peeled off subsequent to painting. Yet another window mask product consists of a razor blade mounted on a squeeze bottle containing a liquid paint mask composed of petroleum distillates, which mask is applied to the window's perimeter through a sponge applicator pad and left to dry. After the mullions and frame are painted the paint and mask drippings are scraped off with the attached razor-type blade.

Each of the foregoing paint mask efforts is plagued with drawbacks. The triangular shield designed to fit over the glass must be cut to size and the overlaps of triangular sections leave gaps that allow paint to seep onto the glass. The blade-style shield alluded to are labor intensive and require accurate positioning of adjacent shields to protect the glass surface. The cardboard shield becomes damp with paint and losses its effectiveness to seat the glass from painting. A spring clamp must be inserted to hold the cardboard sheet to the window. The caulk applicator requires the costly purchase of caulk, the manipulation of a relatively cumbersome caulk applicator, caulk build-up within the applicator, and time-consuming cleanup following caulk application. The razor blade/squeeze bottle method suffers disadvantage in that use of a razor blade to remove paint may scratch treated and energy efficient glass. Accordingly, there is a need in the art for an improved mask for glass to prevent painting the glass while painting mullions.

The present invention represents such an improved mask and application and removal process. When masking windowpanes, the mask is dispensed as a film along the perimeter of a windowpane, the window frame and mullions are painted, and the mask is thereafter peeled or slid off along with any dripped paint. The paint mask comprises a gel or thickened liquid that is spread onto cabinet hardware by means of one's finger, or applied along the perimeter of a window by means of a sponge applicator that is attached to a bottle, canister or other vessel containing the mask gel.

Following painting, the film disadheres and from the glass by peeling or sliding it from the protected surface. An applicator resembling a common sponge-capped bottle applicator similar to those commonly used to apply liquid shoe polish to shoes, may easily be manufactured from plastic. The sponge applicator tip should have at least one corner whose angle measures a right angle or less so as to fit easily into angled window frames. A cap seals and protects the masking material housed within the container. The container's cap may assumes a wedge shape, forming an acute angle at its tip so as to permit access into the corners to lift an edge of the peeelable mask for easy removal. The method of the present invention will be useful to painting contractors, homeowners, hobbyists, autobody servicers, or anyone who paints materials that are adjacent to glass-like surfaces, or who otherwise wish to temporarily mask and protect solid material surfaces from brushed paints and coatings or overspray. A successful hand dispensed paint mask should exhibit the following favorable characteristics:

1. Easy dispensing onto the surface to be protected.
2. Effectively shields the protected surface from or other coating,
3. Easy removal of the mask along with paint drips or paint overspray.

BRIEF DESCRIPTION OF THE DRAWING

The Sole Drawing FIGURE illustrates a container-applicator employed in an embodiment of the present invention.

DETAILED DESCRIPTION OF THE PREFERRED EMBODIMENT(S)

Polymeric Skin

The present invention is distinguished from previous paint masking stick processes in its ability to dispense mask film that ultimately forms a mask skin residing on a lubricated layer that may be removed from the protected surface by sliding or peeling off said skin. Such a skin may be formed by a number of processes.

For example, such a mask skin results when natural latex is mixed with sufficient glycerin. Optimally, natural latex is thickened with thickeners so as to produce a gel-like consistency. Thereafter, glycerin is introduced. The resulting mask, when dispensed onto window glass, cures to form a plastic-like peelable tape that rides on a slippery layer of glycerin. The resulting "tape" is easily slid or peeled from the protected surface. The lubricating glycerin layer enables an extremely thin film of mask to be dispensed that will adequately shield a significant surface area from paint. Where no such lubricating layer exists, more mask product must be applied to provide a mask that is sufficiently thick to overcome adhesion between the mask and the protected surface. In addition, a lubricating layer permits the mask shield to be slid from the surface where the mask layer is too thin and its cohesiveness is not sufficient to allow lifting and peeling.

Essentially, the mask's polymer skin-forming characteristics draw upon those exhibited in durable paints and other polymer-forming coatings. However, unlike paint applications, the mask's durable skin should lack paint's surface adhesion qualities and thereby permit easy removal of the mask layer. This may be accomplished by the addition of a lubricating substance such as a glycol, glycerin, fatty acid, or oil. The mask skin is to be composed of a polymer, often composed of very large molecules called macromolecules, and that are multiples of simpler chemical units called monomers. All polymers can be classified as either addition polymers or condensation polymers. An addition polymer is one in which the molecular formula of the repeating structural unit is identical to that of the monomer, e.g., polyethylene and polystyrene. A condensation polymer is one in which the repeating structural unit contains fewer atoms than that of the monomer or monomers because of the splitting off of water or some other substance. Many paints and coatings employ condensation polymerization when applying a polymer film to a surface. For example, paint, a mixture of a pigment and a binding medium, is usually thinned with a solvent to form a liquid vehicle and is generally applied in thin coats that dry by evaporation or by oxidation of the vehicle to form a film. Acrylic polymers are the binder of choice in producing quality latex paints. Latex paints are essentially emulsions of a polymer in water. Paint without pigment is usually called varnish. Varnish is defined as a liquid which is converted to a transparent or translucent film after application as a thin layer. In general, it a homogenous mixture of film-former, drier and solvent which dries by a combination of evaporation, oxidation and polymerization to give a transparent or translucent film.

The mask polymer skin may be formed by exposing the mask film to air. It may or may not undergo chemical reaction depending upon the existence of linear polymers or simple chemicals that carry out a cross-linking chemical reaction after the mask film has been dispensed and exposed to elements commonly found in the air. Where polymerization occurs due to a chemical reaction between paint and air, the polymer process draws upon air's oxygen and water vapor in particular to act as reactive chemical ingredients. As the solvents evaporate, cross-linking begins and low molecular weight, linear or branched polymers in the mask film are converted to a hard, tough, cross-linked film.

Polyethethylene and polypropylene may be used to create the mask film's skin. The ethylene and propylene form polymers (polyethylene and polypropylene) by joining monomers one after another to the growing chain composed of repeating ethylene and propylene monomers. Polyurethane and silicone polymers (as well as butadiene, styrene, vinyl acetate, and acrylic monomers which form the durable-skin characteristics in latex paints) may be used to dispense a suitable mask skin onto a protected surface by incorporating such polymers into the composition of the frictionally dispensing stick material. Polyurethane polymers are synthetic organic polymers formed of linear repetitions of the urethane group for the production of coating bases. Silicone polymers are mixed organic-inorganic compounds in their backbone and consist of alternating silicon and oxygen atoms with organic groups attached to each of the silicon atoms.

Polyurethanes form some of the highest-performance coatings available. A variety of formulations is marketed. One type is a one-component (one-pot) prepolymer containing excess isocyanate groups. Upon application of the liquid to a surface, these groups react with water from the atmosphere to form a urea, which further reacts with other isocyanate groups to provide the cross-linking necessary to cure the coating.

Higher-molecular-weight silicone polymers exhibit elastic qualities and remain soft and rubbery at very low temperatures. The polymers present in synthetic latexes include a binder dispersed in the water and form films by fusion of the plastic particles as the water evaporates. The size of the molecules, together with their physical state and the structures that they adopt, are the principal causes of the unique properties associated with the polymer mask skin.

Methylcellulose Polymer

Methylcellulose may be also used to achieve an effective mask skin. Cellulose, a polysaccharide polymer that is composed of sugar molecules may be used to create a mask skin. Wood cellulose derived from lignin chemically and then regenerated back to its original composition results in as plastic cellophane material. Cellulose is a naturally occurring polymer made up of repeating glucose units. Although it is a linear polymer, cellulose is thermosetting; that is, it forms permanent, bonded structures that cannot be loosened by heat or solvents without causing chemical decomposition. Its thermosetting behavior arises from strong dipolar attractions that exist between cellulose molecules, imparting properties similar to those of interlinked network polymers. When glycerin is introduced to methylcellulose and water, the resulting polymer cures to form a plastic-like tape that resides upon the non-evaporated glycerin. Methylcellulose and hydroxypropyl methylcellulose are polymers that, when introduced onto the paint mask film that forms a slippery paint barrier when hydrated, (a barrier from which adhering paint may be easily wiped off). Added masking quality triggered when the ether is either hydrated or comes into contact with a gel-triggering solvent within the paint/coating. Methylcellulose and hydroxypropyl methylcellulose are water soluble polymers used for water retention, viscosity modification, binding and other functionalities in a wide variety of industrial products as, gums, coatings, excipients, as well as in processed foods and pharmaceuticals. Nitrocellulose was employed in the production of cellophane and has been employed in paints, as well as the less flammable and more versatile cellulose acetate, Bakelite, and vinyl polymers. These and similar polymers, when introduced into a mask, render a non-adhering coating mask which is easily peeled from the protected underlying surface.

Mask's Peelable Skin

Incorporating the characteristic of a peelable skin into a hand-dispensed paint mask process is what distinguishes the present invention and may be accomplished in a number of ways. The precise proportions comprising the polymer mask medium will vary to accommodate the particular polymer used, the strength and characteristics of the skin desired, and the coating to be masked against. Additionally, the materials making up the mask material will vary to accommodate the particular polymer to be dispensed. The polymeric backbone of cellulose, a natural carbohydrate that contains a basic repeating structure of anhydroglucose units. Hydroxypropyl methylcellulose is created using propylene oxide in addition to methyl chloride to obtain hydroxypropyl substitution on the anhydroglucose units, and this substituent group contains a secondary hydroxyl on the number two carbon and may also be considered to form a propylene glycol ether of cellulose. Both methylcellulose and hydroxypropyl methylcellulose possess properties of organic solubility and affect the thermal gelation temperature of aqueous solutions. The ethers are used as excellent protective colloids, thickeners, improve emulsion stability, suspend solids, lubricate and retain moisture. Their "masking" use to date has been restricted to mask the taste by forming a masking film on water sensitive drugs. The ethers are used in wallpaper pastes because they provide excellent slip properties so patterns can easily be matched. The ethers are used to control viscosity and improve wet tack. The unique combination of organic and water solubility offered by these ethers makes them ideal thickeners for scrape-off and flush-off paint removers. They provide the thickening and cling needed to retain the paint remover on vertical or inclined surfaces, yet permit the softened paint to be rinsed off easily with water. In addition the ethers are used as thickeners for gelled alcohol used in charcoal lighters and canned-fuel products. The ethers in the present invention may be used to thicken masking glycols, including glycerin, and thereby adapt them for solid stick use.

The following is a detailed formulation that has rendered effective results:

Creating the Glycerin/Methyl Cellulose Mixture

1. Combine 10 grams glycerin, 32 grams water, 7 grams propylene glycol, 2 grams of surface-treated methyl cellulose (Dow J75N).
2. Mix ingredients and heat to 90 degrees celsius.
3. Remove from heat.
4. While mixing, slowly add 3 grams of sodium bicarbonate and stir. Some foaming may occur. (The sodium bicarbonate is used to raise the pH of the solution to 8.5 and thereby activate the surface treated methyl cellulose. A litmus check should be done at this point to assure that proper pH has been achieved.)
5. Pour into dispensing containers and let cool.

Ethyl cellulose is a non-water soluble that may be introduced into a mask material to create the peelable skin that is resistant to water soluble coatings. Ethyl cellulose is an ethyl ether of cellulose in the form of white granules obtained from the treatment of wood pulp with alkali, used in plastics and lacquers.

The ethyl cellulose, methylcellulose or hydroxypropyl methylcellulose, when dissolved within a masking ingredient (such as glycerin), renders a paint shielding mask and skin that is effective against oil-based, latex paints, and other surface coatings. Methylcellulose, hydroxypropyl methylcellulose and ethyl cellulose introduced into the masking stick and thereafter dispensed as a mask film, each produces a resulting mask film skin that peels from the surface to be protected.

The Masking Process and Properties

The mixture's methyl cellulose, when adequately hydrated and combined with other ingredients, renders a mask gel capable of depositing an effective paint shield when applied as herein described onto a surface to be protected. Propylene glycol acts as a plasticizer making the masking material's skin non-tacky to paint brushes and rollers. The masking film's skin is cohesive and resists movement when brushed or rolled. After the mask film is dispensed onto the surface, inadvertent paint drips and overspray adhere to the skin of the deposited masking film. As paint on the mask film begins to dry, the water in the film evaporates from the gel leaving in its place a peelable polymer skin. The dried paint resides on this skin. Though water or solvents evaporate from the masking strip, remaining unevaporated oils or glycerin provide a lubricating layer between the protected surface and the paint mask skin upon which dried paint adheres. This lubricating layer allows the film along with any adhering paint drips, coating overspray or other affections to be easily slid or peeled from the protected surface. To the extent alcohol or solvents are substituted for water in the formulation, evaporation and skin formation is accelerated.

Dispenser

It is anticipated that the paint mask gel will be housed within, and introduced and spread by means of, a hand-held tubular container bearing a sponge tip and a moisture-locking cap. The gel advances from the container through the sponge and is spread evenly onto the protected surface by squeezing the container with the hand. Changes may be made to modify the constituents of the masking solid and various additives may be incorporated into the paint mask composition to impart desirable attributes without altering the essential advantages offered by employing a paint mask in dispensable solid form and its unique method of direct mask application. The present invention has proven effective in protecting various materials other than glass. Such materials include metal, wood, painted surfaces, plastic, fiberglass and any other surface upon which a polymer layer may reside.

Referring now to the Drawing FIGURE, the mask gel is housed in a container 4. The housing of the container 4 is squeezed, forcing the mask gel through an aperture 2 of a sponge applicator 3 where the applicator may apply and spread the mask evenly onto the surface to be protected. The term "sponge applicator" is meant to apply to any equivalent flexible and porous or semiporous member that can serve as an applicator for the mask material. An airtight cap 1 protects the sponge applicator 3, seals the tool end from drying out, and protects the user from leakage and inadvertent contact. Here, one corner 5 of the sponge applicator 2 is shaped into a right angle, or a more acute angle, to reach the corners of window panes. The painter may also simply press the masking material out though the aperture 2 onto his finger or onto another tool, for application onto a surface to be protected, such as cabinet hardware.

Uses

The process, formulation and dispenser herein described are not restricted to painting windows. For example, the paint mask would be a valuable asset in the hands of a car and boat body repair serviceman who presently uses more cumbersome methods to mask areas from paint touch up or over-spray. Those areas of the vehicle where spray paint is not desired or that are not to be touched-up with paint are simply masked by dispensing and spreading the mask material film onto that area of the vehicle's surface. Thereafter the body may be brushed, touched up or sprayed and any undesired paint simply peeled away.

While the invention is described with reference to preferred embodiment(s), the invention is not strictly limited to those embodiments. Rather, many modifications and variations would be apparent to persons skilled in the art without departing from the principles of this invention, as defined in the following claims.

I claim:

1. A process of temporarily masking a surface to be protected from paint, varnish, or other coating material and removing the masking; comprising the steps of dispensing and spreading a liquid or gelled mask material onto said surface surface to be protected; said liquid or gelled mask material being a composition that includes a component that cures after application to form a peelable skin, and a glycol or alkene glycol component that forms a lubricant layer between said peelable skin and said protected surface, such that the mask material forms said skin over the protected surface and displays a property of producing said skin as a substantially uniform film on said surface after said mask material has been dispensed and spread across it; and said skin having the property of forming said lubricant layer behind the film skin so that the skin does not adhere to the surface to be protected; said mask material being applied by dragging a sponge applicator that dispenses and spreads a mask liquid or gel across said surface to be protected; permitting said skin to form; applying said coating material; and thereafter sliding, wiping, rinsing or peeling away said mask material together with any adhered coating material from said protected surface.

2. The method of claim 1, wherein said composition includes glycerin, water, propylene glycol, and a cellulosic material selected from the group consisting of methyl cellulose, ethyl cellulose, and hydroxypropyl methycellulose.

3. The method of claim 1, wherein said glycol or alkene glycol component is present in an amount that exceeds the amount of said component that forms the peelable skin.

4. A process of temporarily masking a surface to be protected from paint, varnish, or other coating material and later removing the masking; comprising the steps of dispensing and spreading a liquid or gelled mask material onto said surface surface to be protected; said liquid or gelled mask material being a composition that includes a component that cures after application to form a peelable skin, and a glycol or alkene glycol component that forms a lubricant layer between said peelable skin and said protected surface, such that the mask material forms said skin over the protected surface and displays a property of producing said skin as a substantially uniform film on said surface after said mask material has been dispensed and spread across it; and said skin having the property of forming said lubricant layer behind the film skin so that the skin does not adhere to the surface to be protected; said mask material being applied by dragging the pad of one's finger to spread a mask liquid or gel across said surface to be protected; permitting said skin to form; applying said coating material; and thereafter sliding, wiping, rinsing or peeling away said mask material together with any adhered coating material from said protected surface.

5. The method of claim 4, wherein said composition includes glycerin, water, propylene glycol, and a cellulosic material selected from the group consisting of methyl cellulose, ethyl cellulose, and hydroxypropyl methlycellulose.

6. The method of claim 4, wherein said glycol or alkene glycol component is present in an amount that exceeds the amount of said component that forms the peelable skin.

* * * * *